United States Patent [19]

Fortmann et al.

[11] Patent Number: 5,721,415
[45] Date of Patent: Feb. 24, 1998

[54] METHOD AND APPARATUS FOR DETERMINING AN EVALUATION TIME INTERVAL AND METHOD AND APPARATUS FOR ASSESSING THE QUALITY OF A SPOT WELD BASED ON A VARIATION IN TEMPERATURE IN THE EVALUATION TIME INTERVAL

[75] Inventors: Manfred Fortmann, Much; Volkhard Künnemann, Engelskirchen, both of Germany

[73] Assignee: Siemens Aktiengesellschaft, Munich, Germany

[21] Appl. No.: 605,468

[22] Filed: Feb. 26, 1996

Related U.S. Application Data

[63] Continuation of PCT/DE94/00952 Aug. 19, 1994 published as WO95/05917 Mar. 2, 1995.

[30] Foreign Application Priority Data

Aug. 24, 1993 [DE] Germany ............................ 43 28 363.2

[51] Int. Cl.⁶ ...................................................... B23K 11/25
[52] U.S. Cl. ............................................................ 219/109
[58] Field of Search ........................................ 219/109, 110

[56] References Cited

U.S. PATENT DOCUMENTS

| 3,191,441 | 6/1965 | Erickson | 219/110 |
| 4,359,622 | 11/1982 | Dostoomian et al. | 219/109 |
| 5,298,711 | 3/1994 | Leon | 219/109 |

FOREIGN PATENT DOCUMENTS

| 252 778 | 12/1987 | German Dem. Rep. |
| 268 648 | 6/1989 | German Dem. Rep. |
| 30 30 859 | 2/1982 | Germany . |
| 23 62 520 | 10/1982 | Germany . |
| 31 21 497 | 1/1986 | Germany . |
| 37 11 771 | 10/1988 | Germany . |
| 57-11785 | 1/1982 | Japan ........................... 219/110 |
| 92/10326 | 6/1992 | WIPO . |
| 93/04812 | 3/1993 | WIPO . |

OTHER PUBLICATIONS

Publication Schweissen und Schneiden 45 (1993) No. 6, (Faber et al.), pp. 308–313, "Temperaturmessung beim Widerstandsschweissen".

*Primary Examiner*—Clifford C. Shaw
*Attorney, Agent, or Firm*—Herbert L. Lerner; Laurence A. Greenberg

[57] ABSTRACT

A method and an apparatus for ascertaining an evaluation time interval for assessing the quality of a spot weld based on a course of a temperature at the weld, call for a course of a variable which is unequivocally associated with the temperature to be ascertained for a multiplicity of reference spot welds of differing quality, and for the courses of the variable to be compared with each other. A time interval which is determined from the comparison of the courses is used as the evaluation time interval, and the courses are significantly different from each other and have a sequence which corresponds to a sequence of the qualities of the associated reference spot welds. An allocation of the quality of any spot weld can be carried out simply and precisely by using values of the temperature-dependent variable within the evaluation time interval.

15 Claims, 5 Drawing Sheets

METHOD AND APPARATUS FOR DETERMINING AN EVALUATION TIME INTERVAL AND METHOD AND APPARATUS FOR ASSESSING THE QUALITY OF A SPOT WELD BASED ON A VARIATION IN TEMPERATURE IN THE EVALUATION TIME INTERVAL

CROSS-REFERENCE TO RELATED APPLICATION

This application is a Continuation of International Application Serial No. PCT/DE94/00952, filed Aug. 19, 1994 published as WO95/05917 Mar. 2, 1995.

BACKGROUND OF THE INVENTION

1. Field of the Invention

The invention relates to a method for ascertaining an evaluation time interval for assessing the quality of a spot weld on the basis of a course of a temperature at the spot weld, and a method for assessing the quality of a spot weld on the basis of a course of temperature at the spot weld in an evaluation time interval. The invention also relates to an apparatus for ascertaining an evaluation time interval for testing the quality of a spot weld on the basis of a course of temperature at the spot weld, and an apparatus for assessing the quality of a spot weld.

Published International Patent Application WO 92/10326 in its entirety discusses a method and an apparatus for checking the quality of spot welds. The spot welds are made at two parts which are to be welded together and are made of at least one first metal, through the use of an electrode of a second metal. A course of the temperature at the spot weld is used as a basis to assess the quality of the spot welds. The quality is assumed to become poorer as the curve of the temperature values drops faster and deviates from a straight line. It is thus possible to nondestructively ascertain how good the spot weld is immediately after manufacture, from the course of the temperature. The temperature drop is ascertained through a thermal electric voltage induced between the parts and the electrode.

The following expression $$T_0 \cdot \frac{(t_1 - t_0)}{(T_0 - T_1)}$$

can be used as a scale for evaluating the quality. In that expression, $T_0$ is the temperature determined at a first time $t_0$ after the welding, and $T_1$ is the temperature determined at a second time $t_1$. A typical favorable value for the difference between the two times is about 25 ms. Published International Patent Application WO 92/10326 provides no discussion whatever of the problem of how a favorable value for the difference in the two times might be obtained experimentally, and above all how a favorable value for the first or the second time might be ascertained experimentally. An apparatus described in Published International Patent Application WO 92/10326 A1 for evaluating the quality of a spot weld has at least one voltage measuring device, a trigger which can be connected between two parts that are to be welded together and a welding electrode and which transmits a signal upon the end of a welding operation, and a timer for indicating the beginning and ending of at least one defined period of time after the signal indicating the end of the welding operation is transmitted. The quality assessment is carried out on the basis of the values for the temperature being ascertained in that period of time.

SUMMARY OF THE INVENTION

It is accordingly an object of the invention to provide a method and an apparatus for determining an evaluation time interval and a method and an apparatus for assessing the quality of a spot weld based on a variation in temperature in the evaluation time interval, which overcome the hereinafore-mentioned disadvantages of the heretofore-known methods and apparatuses of this general type and with which a reliable quality assessment of different spot welds is assured with the temperature values located within the evaluation time interval being ascertained, or with the values of a variable associated with the temperature. This assessment of quality should in particular lend itself to being automated. A further object is to disclose a method and an apparatus for assessing the quality of a spot weld on the basis of a course of temperature at the spot weld in an evaluation time interval.

With the foregoing and other objects in view there is provided, in accordance with the invention, a method for ascertaining an evaluation time interval for assessing the quality of a spot weld on the basis of a course of temperature at the spot weld, which comprises determining a respective course of a variable being unequivocally associated with temperature for a plurality of reference spot welds, wherein the reference spot welds each have a different quality, and the quality of the associated reference spot weld is associated with each course of the variable; and determining a time interval in which the courses of the variable are markedly different from one another as the evaluation time interval, wherein the variable for each course has a different mean value, and the mean values are a monotonic function of the quality associated with each course.

The course having the lowest mean value has the lowest quality, and the course with the highest mean value has the highest quality, or vice versa. The quality thus increases or decreases monotonically as the mean value increases. A simple and reliable association of a quality for each spot weld can thus be performed within the evaluation time interval on the basis of the course of the variable and in particular on the basis of the mean value. If the mean value of a course of the variable of a spot weld is located between the courses of the variable of two reference spot welds (reference courses), then the quality of the spot weld is also in between the qualities of the reference spot welds.

A marked differentness of two courses of the variable exists if values of the one course are markedly above the values of the other course, essentially over the entire evaluation time interval. At individual points within the evaluation time interval, the values of the two courses may match, or their sequence may be reversed by a slight amount. In any case, the one course must on average remain markedly above the other course.

In accordance with another mode of the invention, one reference spot weld each of good quality, satisfactory quality and unsatisfactory quality is used. In this way, it is possible in a simple and reliable way to classify other spot welds within the sequence defined by the reference spot welds.

In accordance with a further mode of the invention, in order to determine the beginning of the evaluation time interval, a time from which the courses of the variable diverge markedly onward is especially suitable. It is thus assured that at least around this time, when the time periods are relatively long, the courses are markedly different from one another.

In accordance with an added mode of the invention, the end of the evaluation time interval is determined by a time at which the courses of the variable converge markedly, since if the time periods are even longer, the courses of the variable are no longer markedly different from one another. A determination of the evaluation time interval between a time beyond which the courses diverge and a time beyond which the courses begin to converge can be carried out simply and precisely by automatic comparison units which, for example, are constructed as computer processors.

In accordance with an additional mode of the invention, the evaluation time interval is a maximum of 100 ms long and in particular is about 60 ms long. As a result, the course of the variable over a long time interval is furnished for the quality assessment. Moreover, the quality assessment is markedly improved, since the influence of measurement errors is lessened.

In accordance with yet another mode of the invention, the evaluation time interval includes at least the beginning of solidification of a molten bath which is produced in the case of a good-quality spot weld.

The onset of solidification of a molten bath gives off heat of solidification, which slows the rate of a drop in temperature. As compared with a temperature drop at a spot weld of unsatisfactory quality, in which at most only slight heat of solidification is liberated, the temperature drop at the good spot weld is markedly slowed. The courses of the variable of different spot welds begin to diverge markedly from one another at the onset of solidification.

In accordance with yet a further mode of the invention, a thermal voltage between two welded-together parts of at least one first metal and an electrode of a second metal is used as the variable associated with the temperature. The thermal voltage is simple to determine and in spot welds is markedly dependent on their respective quality within the evaluation time interval. It is also possible to detect the onset of solidification of a molten bath by using the thermal voltage, since a drop in the thermal voltage is slowed down, similarly to what happens to the course of the temperature, as the heat of solidification is liberated.

In accordance with yet an added mode of the invention, the variable is formed from a chronological derivation of the thermal voltage, or from a quotient of the thermal voltage and the chronological derivation. As a result, once again the influence of the solidification of a molten bath is detected and this is a significant characteristic for the quality of a spot weld. A course over time of the quotient provides a clear identification of the time range within which heat of solidification is given off, as a result of which a marked differentness of the courses which are associated with spot welds of different quality, that is a different heat of solidification, is attained.

With the objects of the invention in view, there is also provided a method for assessing the quality of a spot weld on the basis of a course of temperature at the spot weld in an evaluation time interval, which comprises determining an evaluation time interval causing courses over time of a variable associated with a temperature of a plurality of spot welds of different quality to differ markedly from one another; giving the variable a different mean value for each course, with the mean values being a monotonic function of the quality associated with each course; and assessing the quality of the spot weld on the basis of the course of the temperature or of a variable unequivocally associated with the temperatures, wherein the course is determined in the evaluation time interval.

As mentioned above, according to the invention, values of the temperature or of a variable associated with the temperature in an evaluation time interval are used for assessing the quality of a spot weld on the basis of a temperature course at the spot weld. The evaluation time interval is determined in such a way that the courses over time of a variable associated with the temperature of a plurality of spot welds of different quality differ markedly from one another. For each course, the variable has a different mean value and the mean values are a monotonic function of the qualities. A significant association of the quality of a spot weld is attainable with a sequence of the courses that is defined by the mean value. A quotient of the thermal voltage and a first chronological derivation of the thermal voltage is especially suitable as an evaluation number for the quality of the spot weld. The evaluation number may be calculated as a mean value of the quotient over the entire evaluation time interval.

In accordance with another mode of the invention, a quasi-continuous determination of the variable for each time within the evaluation time interval is provided. In this context, quasi-continuously means that the variable is determined, and in particular measured, at a plurality of times within the evaluation time interval. The times, in comparison with the entire evaluation time interval, follow one another in such close succession that a practically exact description of the variable over the entire evaluation time interval is obtained. Typically, the chronological spacing between two times at which the variable is determined is about 0.3 ms to 8 ms and in particular 2 ms. The evaluation time interval typically has a width of about 60 ms. Within the evaluation time interval, the variable is thus determined at approximately 30 times, and through the use of suitable associations, particularly with the aid of simple interpolations, the variable can be determined precisely at each time. The course over time of the variable within the evaluation time interval is thus defined simply and precisely.

In accordance with a further mode of the invention, the mean value of the variable in the evaluation time interval is determined and used as an evaluation number for the quality of the spot weld. The mean value may be determined from all of the values of the variable or from some significant values of the variable. Any existing influence of inaccuracies in determining the variable can be markedly reduced by using this averaging. The evaluation number thus furnishes a simple and reliable indication of the quality of the spot weld.

With the objects of the invention in view, there is additionally provided an apparatus for ascertaining an evaluation time interval for testing the quality of a spot weld on the basis of a course of temperature at the spot weld, comprising a memory unit for storing a course over time of a variable to be unequivocally associated with a temperature and a respective quality of reference spot welds being associated with respective courses, for a plurality of reference spot welds each having a different quality; a comparison unit connected to the memory unit for automatically ascertaining an evaluation time interval by comparing the courses to be stored in the memory unit as a time interval, the courses being markedly different from one another and each having a different mean value, and a monotonic functional relationship existing between the mean values and the qualities; and an output unit connected to the comparison unit for outputting the ascertained evaluation time interval.

As mentioned above, the courses over time of a variable of a plurality of reference spot welds, which is clearly associatable with the temperature, can be stored in the memory unit. The quality of the associated reference spot weld is associated with each course. In the comparison unit, an automatic ascertainment of the evaluation time interval takes place by comparison of the plurality of courses. The evaluation time interval is determined as a time interval in which the courses are markedly different from one another and has a different mean value, and a monotonic functional relationship exists between the mean values and the qualities. The output unit serves to output the ascertained evaluation time interval. The plurality of courses can be supplied to the memory unit all at once, for instance through a separate measuring instrument. The memory unit can likewise be connected directly to a spot welding machine, a thermal voltage occurring between the welding electrodes of the spot welding machine can be detected directly, and optionally the courses of the variable associated with the temperature can be determined therefrom. In that case, the courses of the variable are stored in the memory unit directly after a spot weld is made. The quality, which is associated with the courses of the associated reference spot welds, can be supplied separately to the memory unit or ascertained directly in the memory unit. The courses and the associated qualities are supplied to the comparison unit by the memory unit. The comparison unit preferably has a mean value former, in which a respective mean value of the courses is determined for various time intervals. The comparison unit preferably has a comparator, in which the values of different courses are compared and in which a time can be determined at which the courses for the first time are markedly different from one another. Beginning at this time, it can be automatically ascertained by the comparator whether or not the courses diverge further, and from which point on the courses converge once again. A second time, which represents a terminal point of the evaluation time interval, can be determined from a drop below a predetermined approximation of the courses to one another. The evaluation time interval determined with the comparison unit is carried to the output unit. An output of the evaluation time interval in graphic or data form, for instance, can be provided with the output unit. Preferably, a direct transmittal of the evaluation time interval to an apparatus for quality assessment of spot welds is performed with the output unit.

With the objects of the invention in view, there is furthermore provided an apparatus for assessing the quality of a spot weld, comprising an evaluation unit for assessing a quality of a spot weld on the basis of a course of a temperature or of a variable associated with the temperature in an evaluation time interval, being determined as a time interval in which courses of a plurality of reference spot welds are markedly different from one another and each have a different mean value, and a monotonic functional relationship exists between the mean values and the qualities of the reference spot weld; at least one signal input unit connected to the evaluation unit for supplying the course of the temperature or of a variable associated with the temperature to the evaluation unit; and an output unit connected to the evaluation unit for outputting an outcome of the quality assessment.

Other features which are considered as characteristic for the invention are set forth in the appended claims.

Although the invention is illustrated and described herein as embodied in a method and an apparatus for determining an evaluation time interval and a method and an apparatus for assessing the quality of a spot weld based on a variation in temperature in the evaluation time interval, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
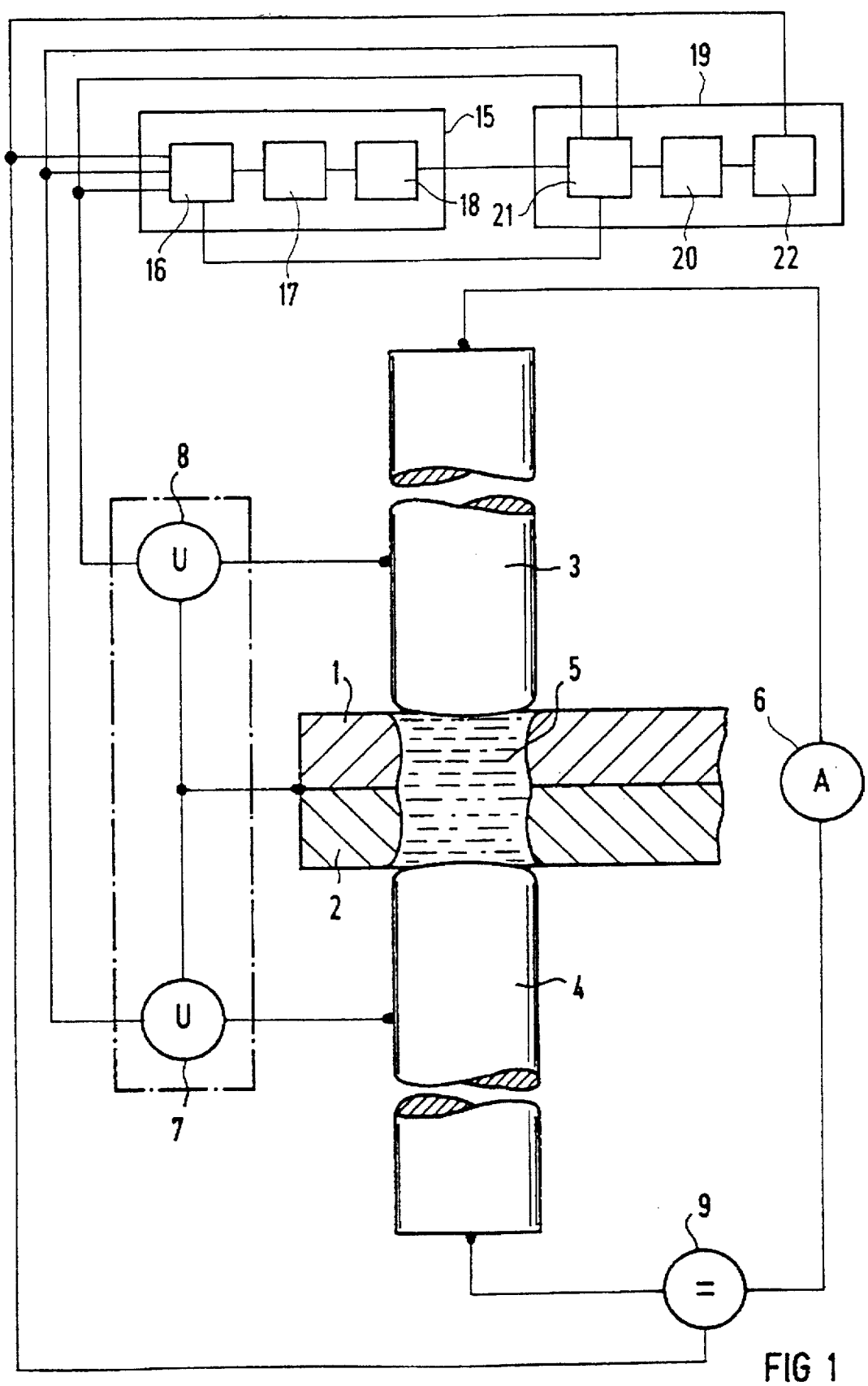
FIG. 1 is a fragmentary, diagrammatic, partly sectional view of an electrode and two sheet metal parts as well as a block circuit diagram of an apparatus for carrying out the method of the invention and for measuring a thermal voltage.

Referring now in detail to the figures of the drawing, which show only those parts of the apparatus that are essential to an explanation of the method, and first, particularly, to FIG. 1 thereof, there is seen an apparatus for carrying out the method for making a spot weld and for measuring a thermal voltage between an electrode 3, 4 and two parts 1, 2 of sheet metal. The parts 1, 2 are pressed together and the electrodes 3, 4 pass a welding current from a current source 9 through the parts 1, 2. The welding current causes heating and finally melting at a spot weld 5, whereby the parts 1, 2 are welded to one another. The welding current is measured through a current meter 6. Voltages associated with the welding current can be determined with two voltage meters 7, 8. After the welding has been carried out, one thermal voltage is measured with each of the voltage meters 7, 8 between an electrode 3, 4 and a part 1, 2 that is in contact with the associated electrode 3, 4.

Both the current source 9 and the voltage meters 7, 8 are connected both to an apparatus 15 for ascertaining an evaluation time interval and to an apparatus 19 for assessing the quality of the spot weld 5 on the basis of the temperature or of a variable associated with the temperature at the spot weld. The apparatus 15 for ascertaining the evaluation time interval has a memory unit 16, a comparison unit 17 and an output unit 18. The memory unit 16 is connected to the current source 9, to the voltage meters 7, 8, and to the apparatus 19 for quality assessment. The courses of the thermal voltage, or of a variable derived from the thermal voltage, and the quality of the spot weld associated with each course, are stored in the memory unit 16. The quality may be transmitted from the apparatus 19 to the memory unit 16, or may be calculated directly in the memory unit 16 itself. The stored courses and the associated qualities are all supplied to the comparison unit 17. The evaluation time interval is determined in the comparison unit 17. The outcome of the determination is carried to the output unit 18 for outputting. From there, it reaches the apparatus 19. In order to produce reference spot welds of different quality, spot welds are made with a variously long or variously high welding current. Adjusting the duration or level of the welding current is carried out in terms of the quality of the reference spot welds, which is ascertained in the apparatus 19. For instance, by suitably increasing the welding current, successive reference spot welds can be made, each having an improved quality over the preceding reference spot welds. The apparatuses 15, 19 may, for instance, be constructed individually or together in a microprocessor or a computer that has corresponding signal inputs, a memory unit, and a processor unit.

In the apparatus 19, an assessment of the quality is made with an evaluation unit 20 on the basis of the course of the temperature, or of a variable such as the thermal voltage that is associated with the temperature, in the evaluation time interval. The course of the variable is supplied to the evaluation unit 20 through a signal input unit 21. The evaluation unit 20 is also supplied through the signal input unit 21 with the duration of the evaluation time interval and with the beginning of the evaluation time interval after the ending of the welding operation. These items of information may be stored in memory directly in the evaluation unit 20. The signal input unit 21 is connected directly to the voltage meters 7, 8 and to the memory unit 16, in which the courses of the thermal voltage, or of a variable derived from the thermal voltage, are stored in memory. The evaluation unit 20 is connected to an output unit 22, by way of which an outputting of the outcome of the quality assessment is effected, for instance in the form of a graphic display or in the form of data signals, which can be supplied to a computer or a printer. In the evaluation unit 20 an automatic regulation of the spot welding machine that makes the spot welds can also be carried out, likewise from the quality assessment being performed. To that end, by way of example, a control signal for controlling the welding current source 9 is output through the output unit 22. The evaluation unit 20, the signal input unit 21, and the output unit 22 may be constructed either as units that are separate from one another or as a single unit, for instance in a computer.

Figure 2A:
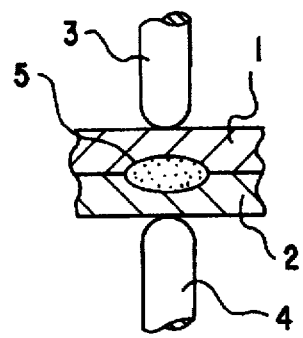
FIG. 2 is a diagram of a temperature course for different spot welds shown with electrodes and metal parts in a fragmentary, partly sectional view.
Figure 2:
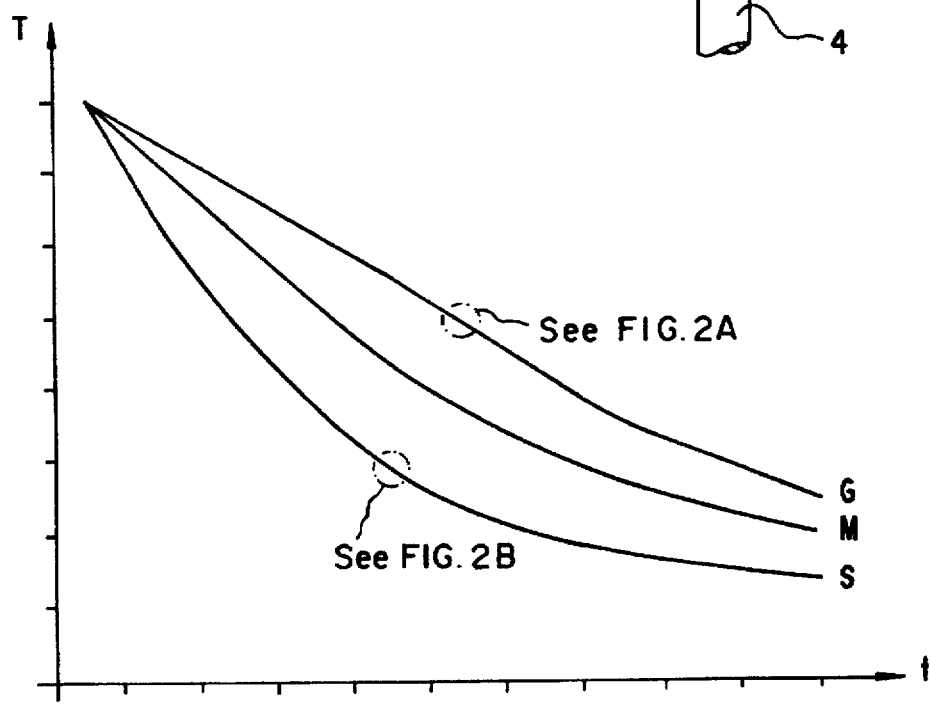
Figure 2B:
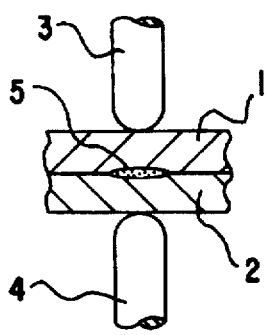

FIG. 2 illustrates three different temperature courses at a spot weld qualitatively. The courses are identified by the respective letters G (for good), M (for medium), and S (for bad). The course marked G is approximately linear in some regions and in a middle range has a slight upward bulge that can be ascribed to a delay in the temperature drop caused by a heat of solidification at the spot weld 5 which is given off in this temperature range. The courses marked M and S lack any such bulge, and accordingly the spot weld 5 in that case is at most only slightly pronounced.

Figure 3:
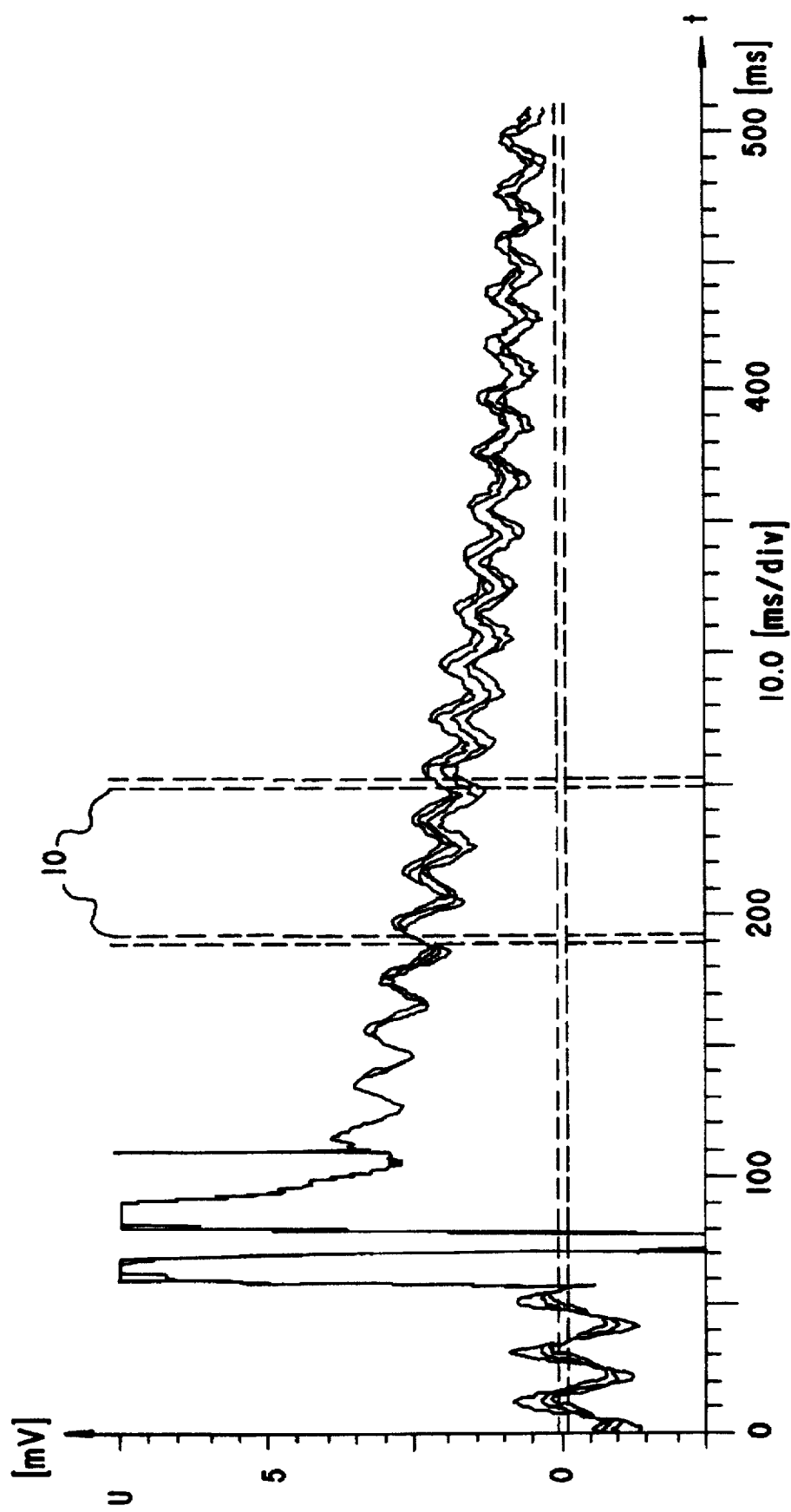
FIG. 3 is a diagram showing a course of the thermal voltage for various spot welds.

FIG. 3 shows a course of the voltage ascertained with a voltage meter 7, 8, which is determined with the apparatus shown in FIG. 1. This is a thermal electric voltage between an electrode and the welded-together parts 1, 2. In this case a chronologically periodic signal that can be ascribed to the use of an alternating current welding system is superimposed on the voltage signal. In a period which is about 80 ms in length, a very high voltage pulse, which characterizes the welding, can be seen. At longer time periods, a drop in the voltage can be seen. The voltage courses of four different reference spot welds of different quality are shown in FIG. 3. A clear distinction between the various courses can be made at about 100 ms after the end of the welding pulse. At relatively long times, a new approximation of the courses to one another occurs, making them no longer clearly distinguishable from one another. An evaluation time interval for the quality assessment should therefore be chosen within the ranges in which the courses diverge and converge again. An evaluation time interval 10 which is shown is 60 ms long and begins at a time when the courses are markedly different from one another for the first time.

Figure 4:
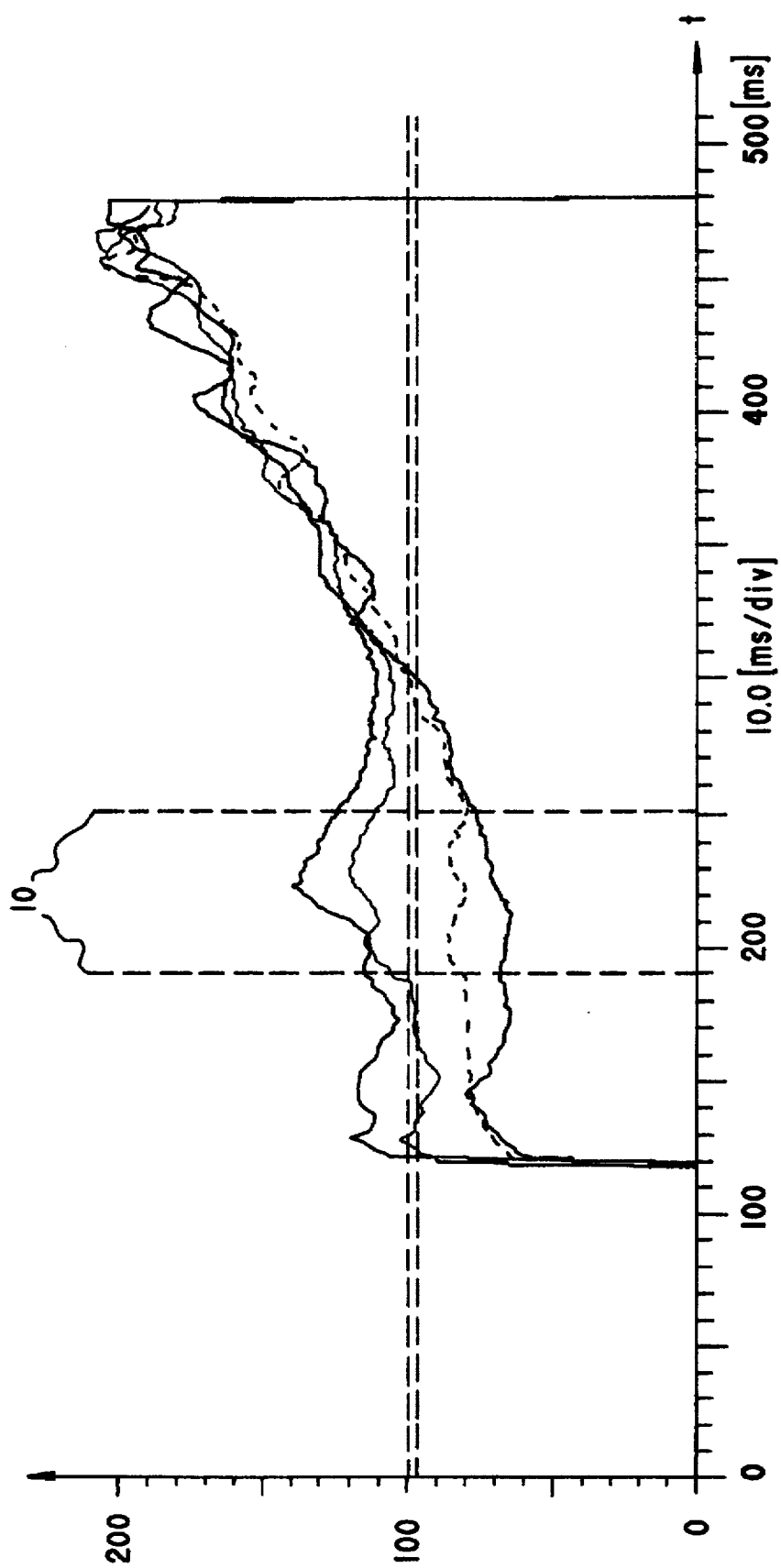
FIG. 4 is a diagram showing a course of a variable formed from the thermal voltage and a first chronological derivation of the thermal voltage.

FIG. 4 shows a course of a variable that is formed from a quotient of the thermal voltage and the first chronological derivation of the thermal voltage. The periodic signal superimposed on the thermal voltage is eliminated in this case. As in FIG. 3, four different courses with different quality of the associated reference spot welds are shown. In a middle range, the courses are markedly different from one another and are ordered in a sequence defined by the mean values. This sequence matches the sequence of qualities of the associated reference spot welds, with the uppermost course corresponding to the highest quality and the lower course corresponding to the lowest quality. As the mean value rises, the quality thus increases as well. There is a monotonic functional relationship between the mean values and the qualities. A mean value of the values of a course, associated with a reference spot weld, within the evaluation time interval 10, can be used as an evaluation number for the quality. In this case, an evaluation number of 124 is associated with the uppermost course and therefore with the associated reference spot weld, while the evaluation numbers 112, 81 and 66 are then associated with the courses that succeed it in the downward direction. The value of 100 is set as the evaluation number for a spot weld that is still just barely satisfactory. Within the evaluation time interval 10 it is simple and precise to achieve an evaluation of an arbitrary spot weld, because of the clear distinguishability of the various courses. The location of the evaluation time interval 10 is substantially determined, and can be determined in automated fashion, by the requirement for clear distinguishability of the courses and the requirement that the mean values be a monotonic function of the qualities.

Figure 5:
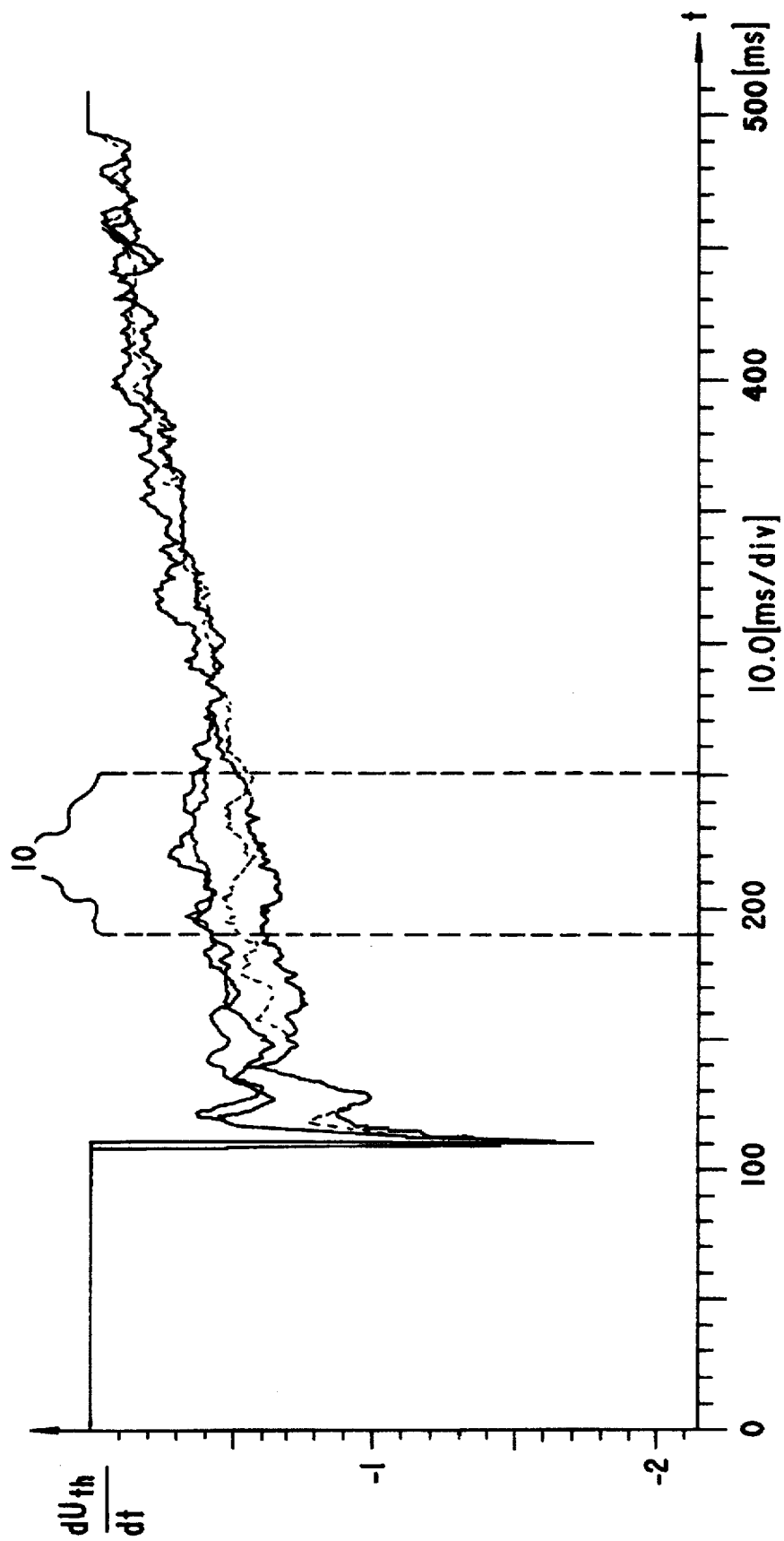
FIG. 5 is a diagram showing a course of the first chronological derivation of the thermal voltage.

In FIG. 5, four different courses of the first chronological derivation of the thermal voltage for the reference spot welds already used in FIGS. 3 and 4 are shown. Within the evaluation time interval 10, once again a clear distinction among the courses is apparent, and a sequence of the courses that is defined by the mean values exists. The mean values are a monotonic function of the qualities of the associated reference spot welds. The end of the evaluation time interval is defined by the fact that outside the evaluation time interval 10, in the case of longer periods of time, a clear distinction among the courses is no longer possible.

The method for ascertaining an evaluation time interval is distinguished by the fact that for a plurality of reference spot welds each of different quality, the various courses of a variable which is associated with the temperature are compared with one another. With the comparison, an evaluation time interval is determined in which the courses of the variable are markedly different from one another and each have a mean value. The mean values are a monotonic function of the qualities of the associated reference spot welds. Using the values of the variable within the evaluation time interval thus assures a simple, precise association of a quality with a spot weld, in comparison with the reference spot welds. It is therefore favorable if each of the reference spot welds include one reference spot weld each of good, satisfactory, and unsatisfactory quality. A method for quality assessment of spot welds on the basis of a temperature course within the evaluation time interval is thus advantageous.

We claim:

1. A method for ascertaining an evaluation time interval for assessing the quality of a spot weld on the basis of a course of temperature over time at the spot weld, which comprises:

a) determining a respective course over time of a variable, the variable being associated with temperature for a plurality of reference spot welds, wherein the reference spot welds each have a different quality, and the quality of the associated reference spot weld is associated with each course over time of the variable; and b) determining a time interval in which the courses over time of the variable are different from one another as the evaluation time interval, wherein the variable for each course over time has a different mean value, and the mean values are a monotonic function of the quality associated with each course.

2. The method according to claim 1, which comprises including one spot weld of a good quality, one spot weld of a satisfactory quality and one spot weld of an unsatisfactory quality, in the reference spot welds.

3. The method according to claim 1, which comprises determining a time as a beginning of the evaluation time interval, at which the courses of the variable diverge.

4. The method according to claim 1, which comprises determining a time as an end of the evaluation time interval, at which the courses of the variable converge.

5. The method according to claim 1, which comprises setting a length of the evaluation time interval at a maximum of 100 ms.

6. The method according to claim 1, which comprises setting a length of the evaluation time interval at approximately 60 ms.

7. The method according to claim 1, which comprises including at least an onset of solidification of a molten bath in the evaluation time interval, for a spot weld of good quality.

8. The method according to claim 1, which comprises forming the variable from a thermal voltage between two welded-together parts of at least one first metal and an electrode of a second metal.

9. The method according to claim 8, which comprises forming the variable from a time derivation of the thermal voltage.

10. The method according to claim 8, which comprises forming the variable from a quotient of the thermal voltage and a time derivation of the thermal voltage.

11. A method for assessing the quality of a spot weld on the basis of a course of temperature over time at the spot weld in an evaluation time interval, which comprises:

determining an evaluation time interval causing courses over time of a variable associated with a temperature of a plurality of spot welds of different quality to differ from one another;

determining a different mean value of the variable for each course over time, with the mean values being a monotonic function of the quality associated with each course over time; and assessing the quality of the spot weld on the basis of the course of the temperature over time or of a variable associated with the temperatures, wherein the course over time is determined in the evaluation time interval.

12. The method according to claim 11, which comprises determining the variable for each time within the evaluation time interval.

13. The method according to claim 11, which comprises determining a mean value of the variable in the evaluation time interval, and using the mean value of the variable as an evaluation number for the quality of the spot weld.

14. An apparatus for ascertaining an evaluation time interval for testing the quality of a spot weld on the basis of a course of temperature over time at the spot weld, comprising:

a) a memory unit for storing a course over time of a variable, the variable to be associated with a temperature and a respective quality of reference spot welds being associated with respective courses over time, for a plurality of reference spot welds each having a different quality;

b) a comparison unit connected to said memory unit for automatically ascertaining an evaluation time interval by comparing the courses over time to be stored in said memory unit as a time interval, the courses over time being different from one another and each having a different mean value, and a monotonic functional relationship existing between the mean values and the qualities; and c) an output unit connected to said comparison unit for outputting the ascertained evaluation time interval.

15. An apparatus for assessing the quality of a spot weld, comprising:

a) an evaluation unit for assessing a quality of a spot weld on the basis of a course of a temperature over time or of a variable associated with the temperature in an evaluation time interval, being determined as a time interval in which courses over time of a plurality of reference spot welds are different from one another and each have a different mean value, and a monotonic functional relationship exists between the mean values and the qualities of the reference spot weld;

b) at least one signal input unit connected to said evaluation unit for supplying the course of the temperature over time or of a variable associated with the temperature to said evaluation unit; and c) an output unit connected to said evaluation unit for outputting an outcome of the quality assessment.

* * * * *